United States Patent
Ehrath et al.

(10) Patent No.: US 6,800,325 B2
(45) Date of Patent: Oct. 5, 2004

(54) METHOD OF PRODUCING AN INTERIOR FITMENT FOR VEHICLES, AND INTERIOR FITMENT PRODUCED ACCORDINGLY

(75) Inventors: Martin Ehrath, Goeppingen (DE); Christian Hoering, Kirchheim unter Teck (DE)

(73) Assignee: Erwin Behr Automotive GmbH, Wendlingen (DE)

( * ) Notice: Subject to any disclaimer, the term of this patent is extended or adjusted under 35 U.S.C. 154(b) by 104 days.

(21) Appl. No.: 10/179,926

(22) Filed: Jun. 24, 2002

(65) Prior Publication Data

US 2003/0162045 A1 Aug. 28, 2003

(30) Foreign Application Priority Data

Feb. 25, 2002 (DE) .......................................... 102 09 014

(51) Int. Cl.$^7$ .................. B32B 21/04; B32B 21/14; B32B 27/20; B32B 31/14; B32B 31/22

(52) U.S. Cl. .................. 427/291; 427/289; 427/290; 427/299; 427/307; 427/308; 427/314; 427/316; 427/322; 427/324; 427/325; 427/372.2; 427/381; 427/382; 427/384; 427/317; 427/388.5; 427/389.9; 427/392; 427/393; 427/394; 427/395; 427/396; 427/397; 427/407.1; 427/408; 427/421; 427/428; 427/429; 428/219; 428/340; 428/341; 428/342; 428/481; 428/485; 428/537.1; 106/243; 106/244; 106/250; 106/251; 106/252; 106/253; 106/264; 106/266; 106/267

(58) Field of Search .................. 428/212, 323, 428/325, 328, 329, 330, 331, 425.1, 479.3, 479.6, 481, 485, 507, 511, 537.1; 106/243, 244, 246, 250, 251, 252, 253, 264, 266, 267; 427/299, 307, 308, 314, 316, 317, 322, 324, 325, 372.2, 384, 385.5, 389.9, 392, 393, 396, 397, 407.1, 408, 415, 421, 428, 429

(56) References Cited

U.S. PATENT DOCUMENTS

| | | | | |
|---|---|---|---|---|
| 4,132,724 A | * | 1/1979 | Turner | 556/27 |
| 4,505,986 A | * | 3/1985 | Geerdes et al. | 428/481 |
| 4,857,578 A | * | 8/1989 | Hall | 524/488 |
| 5,397,385 A | * | 3/1995 | Watts | 106/18.32 |
| 5,744,210 A | * | 4/1998 | Hofmann et al. | 428/106 |
| 5,912,299 A | * | 6/1999 | Tomko et al. | 524/840 |
| 6,387,519 B1 | * | 5/2002 | Anderson et al. | 428/447 |
| 6,436,159 B1 | * | 8/2002 | Safta et al. | 51/298 |
| 2001/0039324 A1 | * | 11/2001 | Sadvary et al. | 528/29 |
| 2001/0039996 A1 | * | 11/2001 | Goldschmid et al. | 156/183 |
| 2001/0051229 A1 | * | 12/2001 | Witt | 427/508 |

FOREIGN PATENT DOCUMENTS

DE 689 18 575 8/1990

OTHER PUBLICATIONS

"Taschenbuch Fuer die Farben—und Lackindustrie sowie fuer den einschlaegigen Handel", 13. Auflage, 1954, Seiten 1 bis 5, 57, 500 bis 505. (translation—"Pocket books for the paint arts and lacquer arts industry as well as for the appropriate trade", 13.edition, 1954, pp. 1 to 5, 57, 500 to 505).

Leaflet of Kreidezeit Naturfarben GmbH entitled "Fussbodenhartoel" dated Oct. 2001.

* cited by examiner

*Primary Examiner*—Vivian Chen
(74) *Attorney, Agent, or Firm*—Barry R. Lipsitz; Douglas M. McAllister

(57) ABSTRACT

The invention relates to a method of producing an interior fitment for motor vehicles, the interior fitment having on its facing side a wood molding which is provided with a coating. In order to impart a substantially natural impression to the interior fitment, the invention proposes applying to the wood molding a coating material based on vegetable-oil-modified resins and natural vegetable oils, with the addition to the coating material of ceramic microparticles. Likewise proposed is an interior fitment produced preferably by this method.

21 Claims, 1 Drawing Sheet

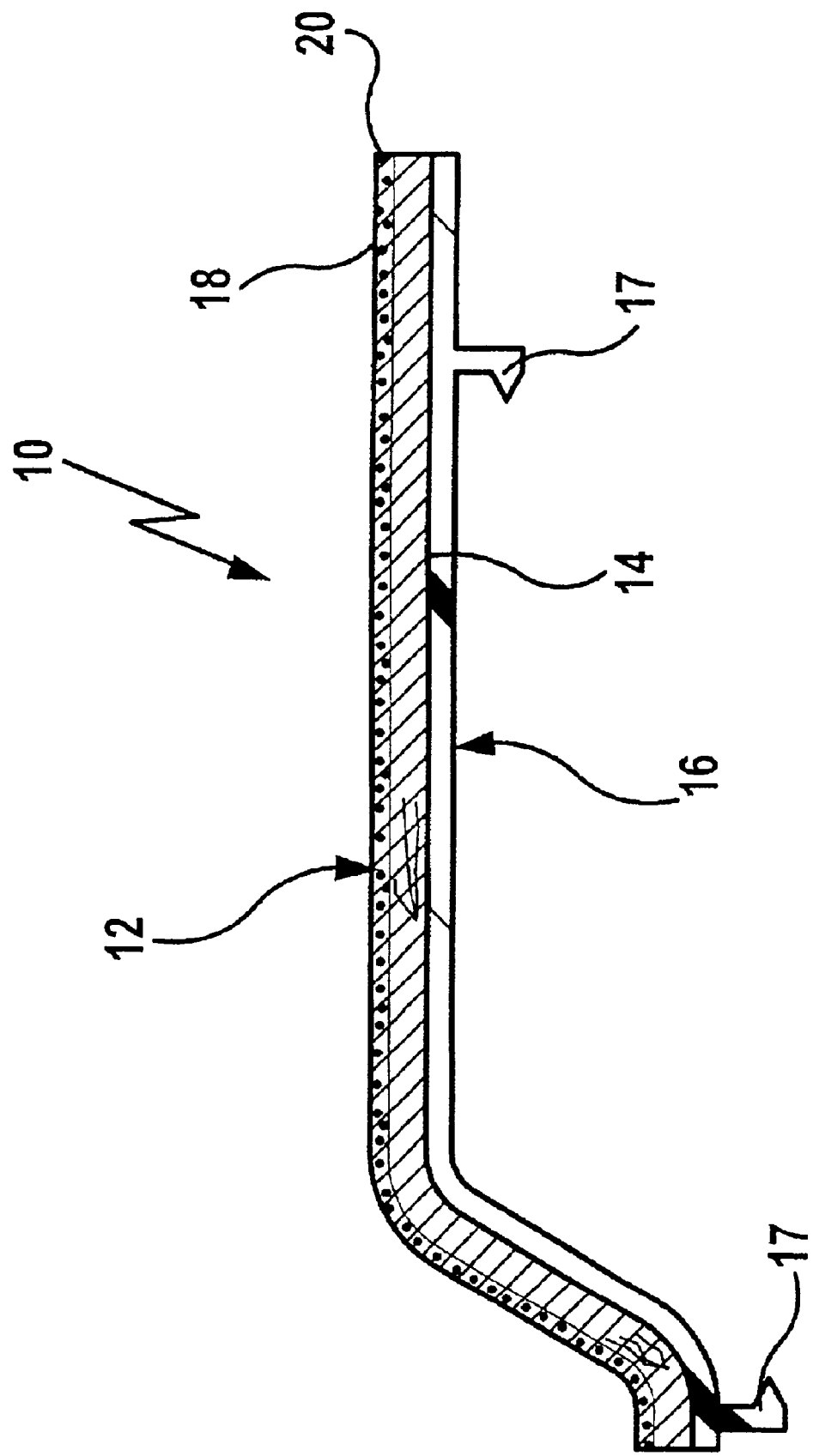

METHOD OF PRODUCING AN INTERIOR FITMENT FOR VEHICLES, AND INTERIOR FITMENT PRODUCED ACCORDINGLY

BACKGROUND OF THE INVENTION

The present disclosure relates to the subject matter disclosed in German application No. 102 09 014.9 of Feb. 25, 2002, which is incorporated herein by reference in its entirety.

The invention relates to a method of producing an interior fitment for vehicles, the interior fitment having on its facing side a wood molding which is provided with a coating.

The invention also relates to an interior fitment for vehicles which comprises a wood molding coated on its facing side.

Interior fitments are increasingly being employed as trim components for the design of vehicle interiors, especially interiors of automobiles. They serve for decoration and are fitted predominantly in the region of the dashboard and the vehicle doors. On their facing side, the interior fitments comprise a wood molding—wood veneer or even solid wood, for example—and on the reverse they are normally equipped with a support layer which gives the wood molding the required mechanical stability and which allows the interior fitment to be anchored in the interior of the vehicle.

The wood moldings are customarily provided with a high-gloss varnish coating. For this purpose, a varnish is applied to the facing side of the wood molding, often by spraying. In such a process, two or more coats are generally needed in order to obtain the desired sealing of the wood molding and an extremely glossy surface. The varnishes are customarily based on polyester or polyurethane. They give the interior fitment a clearly visible coating, which admittedly has the advantage that it emphasizes the grain of the wood molding and produces a visually appealing "depth effect". The varnish coatings of this kind have the disadvantage, however, that they greatly alienate the feel of the wood molding and give it a very unnatural appearance.

SUMMARY OF THE INVENTION

It is an object of the present invention to provide a method of producing an interior fitment of the generic type, and to provide an interior fitment produced accordingly, which gives an impression as close as possible to that of nature.

In a method of the type specified at the outset, this object is achieved in accordance with the invention by applying to the wood molding a coating material based on vegetable-oil-modified resins and natural vegetable oils, with the addition to the coating material of ceramic microparticles.

On application, the coating material may have, for example, a waxlike or liquid consistency, and penetrate into the surface of the wood molding.

In a departure from the normal coatings for interior fitments, the method in accordance with the invention does not use a varnish which alienates the natural appearance and feel of the wood molding or forms a covering layer; instead, a coating material is employed which penetrates the wood molding and forms a polymeric network having good resistance properties, with practically complete retention of the natural surface of the wood molding. Accordingly, the wood molding imparts the natural impression of wood both to the eye and the hand, and thereby acquires a particular value. Nevertheless, the interior fitment satisfies the stringent requirements imposed on motor vehicle interior fitments, displaying in particular a high scratch resistance and hardness. The interior fitment in accordance with the invention has the advantage, moreover, that it is inexpensive to repair if damaged, since such repair merely requires that the coating material be reapplied to the wood molding, with no need to uninstall the interior fitment from the vehicle.

The coating employed in accordance with the invention is biodegradable, and so the interior fitment can be disposed of without problems. The use of vegetable-oil-modified resins and natural vegetable oils makes it possible to use only mild-odor solvents for the coating material; in particular, it is possible to do away with the use of toxic and intensely odorous styrene, toluene, benzenes or the like, and also with that of sensitizing isocyanates and intensely odorous solvents.

It has been found, moreover, that the coating of the wood molding can be carried out inexpensively on account of the fact that much less coating material and fewer worksteps are required than is the case when varnishing with polyester or polyurethane varnishes.

It is of particular advantage to apply the coating material in two or more coats: in a first application step, the coating material is applied as a primer without the addition of ceramic microparticles, and at least in a final application step the coating material is applied with the addition of ceramic microparticles. In the first application step, the coating material adopts the function of a primer oil or sealer which penetrates deep into the wood molding, wets the wood substrate, and ensures an optimal bond, i.e., good anchoring and firm adhesion. At least in a final application step, abrasion-enhancing ceramic micro-particles are added to the coating material. The final application step serves to produce a topcoat or performance coat, the coating material with addition of the ceramic microparticles forming a covering material which gives the interior fitment the required service properties. The addition of the abrasion-improved ceramic microparticles ensures the requisite hardness, scratch resistance, and abrasion resistance of the coating.

One preferred embodiment of the method in accordance with the invention envisages drying the applied coating material after the first application step and then in a second application step applying the coating material again as a further primer, without the addition of ceramic microparticles, and in turn drying it. This allows particularly good adhesion of the coating.

It is useful to sand the wood molding after the first application step. By means of the sanding it is possible to ensure particularly effective bonding of the overall coating system.

Drying of the applied coating material is preferably accompanied by the supplying of oxygen; for example, supply of air. This assists the oxidative curing process which takes place following application of the coating material. In the course of this curing process the double bonds present in the unsaturated fatty acids of the dry [sic] oils of the coating material react intermolecularly with one another and form a polymeric network having good resistance properties.

The applied coating material dries preferably at room temperature. It has been found that a drying operation of this kind gives the coating on the wood molding particularly good stability.

The coating material may comprise, for example, linseed- and/or soybean-oil-modified resins.

Natural vegetable oils which can be employed for the coating material include, for example, linseed oils and/or soybean oils.

For applying the coating material a diluent is employed, preferably volatile aliphatic hydrocarbons: isoparaffins and white spirit free from aromatics, for example.

Diluents of this kind are very low in odor and ensure that in its end state the interior fitment exhibits virtually no extraneous odors.

It is useful to add a lead-free drying agent to the coating material, since this makes it possible to accelerate the drying operation.

In order to accelerate the crosslinking reaction of the fatty acids in the coating material, it is of advantage if the coating material comprises zirconium compounds and/or cobalt compounds as drying agents, since these act as catalysts for the crosslinking reaction.

The ceramic microparticles employed in accordance with the invention are added preferably in powder form to the coating material. Ceramic microparticles which can be employed in this context include porcelain powders or porcelainlike powders.

One preferred embodiment of the method in accordance with the invention envisages applying the coating material in a total amount of not more than approximately 150 g/m$^2$. It has been found that such an amount of coating material is sufficient to give the wood molding the properties required for use in the interior of a vehicle, such as scratch resistance and light stability, for example, while ensuring that there is no alienation of the "wood impression"; in other words, both in respect of look and in respect of touch, the natural impression of the wood is retained.

It is useful if in a first application step the coating material is applied in an amount of not more than about 40 g/m$^2$, preferably about 20 g/m$^2$ to about 40 g/m$^2$. It has proven particularly useful if the coating material in the first application step is applied in an amount of about 25 g/m$^2$ to about 35 g/m$^2$.

The final application step takes place preferably with an amount of coating material, including added ceramic microparticles, of not more than about 20 g/m$^2$, preferably about 10 g/m$^2$ to about 15 g/m$^2$.

It is useful if the second application step takes place with an amount of coating material of not more than about 35 g/m$^2$, preferably about 15 g/m$^2$ to about 35 g/m$^2$, with an amount of about 20 g/m$^2$ to about 30 g/m$^2$ having proven particularly useful for giving the coating particularly high hardness and also scratch resistance and abrasion resistance.

The application of the coating material to the wood molding can take place at least in one application step by means of spray application.

Alternatively and/or additionally it is possible to envisage applying the coating material, at least in one application step, by means of a roller or brush to the wood molding.

It has proven particularly advantageous for the coating material to be applied by means of a roller or brush in the first application step and to be sprayed onto the wood molding in the subsequent application steps.

As mentioned at the outset, the invention also extends to an interior fitment for vehicles which comprises a wood molding coated on its facing side, the interior fitment having been produced preferably by the method specified above. In order to ensure that the interior fitment gives an impression close to that of nature, the invention envisages applying to the wood molding a coating material based on vegetable-oil-modified resins and natural vegetable oils, ceramic microparticles being added to the coating material.

As explained above, an interior fitment of this kind has the advantage that it gives the impression of natural wood, both in a visual respect and with a view to its haptic properties, with the fitment being repairable inexpensively at any time in the event of damage, by renewed application of the coating material. Moreover, the interior fitment has extremely low emissions; in particular, it does not include any toxic and intensely odorous styrene.

Ceramic microparticles added to the coating material preferably comprise porcelain powders or porcelainlike powders, which impart particularly high scratch resistance to the interior fitment.

On its reverse the interior fitment preferably has a support layer on which the wood molding is mounted and which comprises anchoring elements for attaching the interior fitment in the interior of the vehicle.

BRIEF DESCRIPTION OF THE DRAWING

The FIGURE shows an interior fitment for motor vehicles.

The invention is explained in more detail by the following description of a preferred embodiment, in conjunction with the drawing.

DETAILED DESCRIPTION OF THE INVENTION

The drawing depicts an interior fitment, designated overall by the reference numeral 10, in the form of a trim component for use in the interior of a vehicle. On its facing side, the trim component 10 has a wood molding in the form of a wood veneer 12, the rear side 14 of which lies flat on a support layer 16 and is attached to the support layer 16. The support layer 16 is configured as a plastics molding and forms catch elements 17 which can be used to fix the trim component 10 in the interior of a vehicle: for example, in the region of the dashboard or of the vehicle doors.

On its visible side 18 facing away from the reverse 14, the wood veneer 12 is provided with a coating 20, depicted schematically in the drawing, which gives the trim component 10 the hardness, scratch resistance, and abrasion resistance which are required in the construction of the interior of a vehicle, especially an automobile.

To produce the coating 20, in a first application step the wood veneer fixed to the support layer 16 is provided with a primer. For this purpose, a coating material is applied to the facing side 18 and penetrates the wood veneer 12. This coating material is a combination of vegetable-oil-modified resins, linseed-oil-modified or soybean-oil-modified resins for example, natural vegetable oils, linseed or soybean oil for example, lead-free dryers (siccatives), diluents, volatile aliphatic hydrocarbons for example, preferably isoparaffins and petroleum spirit free from aromatics, and also zirconium compounds and cobalt compounds as catalysts for accelerating the crosslinking reaction of the unsaturated fatty acids in the coating material.

In the first application step, the coating material is applied to the wood veneer 12 as a primer by spraying on an amount of about 25 to about 35 g/m$^2$. Thereafter the trim component 10 is subjected to a room-temperature drying operation which lasts preferably for about 16 hours.

Alternatively to the spray application, the first priming operation can also be done by roller application. In that case it is useful for the applied coating material to be rubbed into the wood veneer, which can be done using a brushing device.

After drying, which is carried out accompanied by supply of oxygen, the facing side 18 of the wood veneer 12 is sanded before the coating material is Applied again in a second application step by spraying, this time in an amount of about 20 to 30 g/m². The trim component is then again subjected to drying accompanied by supply of oxygen.

In a third and final application step, the coating material is applied by spraying onto the wood veneer 12, accompanied by the addition of abrasion-enhancing ceramic microparticles—by the addition, for example, of porcelain powder or porcelainlike powder, and is again subjected to drying, during which air is supplied.

Alternatively, in order to obtain a particularly high scratch resistance and abrasion resistance, it is possible to provide for addition of the abrasion-enhancing ceramic microparticles to the coating material as early as during the second application step.

After the drying operation following the final application step, there is no further need to carry out work on the wood veneer 12; instead, the trim component can be subjected to a final check without further working. The trim component can then be mounted in the interior of a vehicle: for example, in the region of the dashboard and/or the vehicle doors and/or else as a trunk lining.

What is claimed is:

1. A method of producing an interior fitment for motor vehicles, the interior fitment having on its facing side a wood molding, the method comprising:

applying to the wood molding a coating material based on vegetable-oil-modified resins and natural vegetable oils, with the addition to the coating material of ceramic microparticles;

wherein the coating material is applied in a plurality of coats, the coating material being applied in a first application step as a primer, without the addition of ceramic microparticles, and the coating material being applied at least in a final application step with the addition of ceramic microparticles.

2. The method of claim 1, wherein after the first application step the applied coating material is dried and then in a second application step the coating material is applied as a further primer without the addition of ceramic microparticles and is dried again.

3. The method of claim 2, wherein the coating material in the second application step is applied in an amount of about 15 g/m² to about 35 g/m², preferably about 20 g/m² to approximately 30 g/m².

4. The method of claim 1, wherein the wood molding is sanded after the first application step.

5. The method of claim 1, wherein drying of the applied coating material is accompanied by the supplying of air.

6. The method of claim 1, wherein the coating material comprises linseed-oil-modified and/or soybean-oil-modified resins.

7. The method of claim 1, wherein the coating material comprises linseed oil and/or soybean oil.

8. The method of claim 1, wherein the coating material comprises volatile aliphatic hydrocarbons as diluents.

9. The method of claim 1, wherein the coating material comprises a drying agent.

10. The method of claim 9, wherein the drying agent comprises zirconium compounds and/or cobalt compounds.

11. The method of claim 9, wherein the drying agent is lead-free.

12. The method of claim 1, wherein the ceramic microparticles are added in powder form.

13. The method of claim 12, wherein said added ceramic microparticles comprise porcelain powders.

14. The method of claim 1, wherein the coating material is applied in a total amount of not more than approximately 150 g/m².

15. The method of claim 1, wherein the coating material in the first application step is applied in an amount of about 20 g/m² to about 40 g/m², preferably from 25 g/m² to 35 g/m².

16. The method of claim 1, wherein the coating material in the final application step with added ceramic microparticles is applied in a total amount of not more than about 20 g/m², preferably from about 10 g/m² to about 15 g/m².

17. The method of claim 1, wherein the coating material at least in one application step is sprayed onto the wood molding.

18. The method of claim 1, wherein the coating material at least in one application step is applied to the wood molding by means of a roller or a brush.

19. The method of claim 1, wherein the coating material in the first application step is applied by means of a roller or brush and in the subsequent application steps is sprayed onto the wood molding.

20. An interior fitment for vehicles, comprising:

a wood molding coated on its facing side with a coating material based on vegetable-oil-modified resins and natural vegetable oils, with the addition to the coating material of ceramic microparticles;

wherein the coating material is applied in a plurality of coats, the coating material being applied in a first application step as a primer, without the addition of ceramic microparticles, and the coating material being applied at least in a final application step with the addition of ceramic microparticles.

21. The interior fitment of claim 20, wherein the ceramic particles are added to the coating material in the form of porcelain powder.

* * * * *